(12) United States Patent
Kung

(10) Patent No.: US 8,634,218 B2
(45) Date of Patent: Jan. 21, 2014

(54) MONOLITHIC AC/DC CONVERTER FOR GENERATING DC SUPPLY VOLTAGE

(75) Inventor: David Kung, Hillsborough, CA (US)

(73) Assignee: Power Integrations, Inc., San Jose, CA (US)

( * ) Notice: Subject to any disclaimer, the term of this patent is extended or adjusted under 35 U.S.C. 154(b) by 390 days.

(21) Appl. No.: 12/587,398

(22) Filed: Oct. 6, 2009

(65) Prior Publication Data

US 2011/0080761 A1    Apr. 7, 2011

(51) Int. Cl.
*H02M 7/219* (2006.01)

(52) U.S. Cl.
USPC .............................. 363/89; 363/127; 363/147

(58) Field of Classification Search
USPC .......................... 363/76, 77, 84, 89, 127, 147
See application file for complete search history.

(56) References Cited

U.S. PATENT DOCUMENTS

| | | | |
|---|---|---|---|
| 3,740,581 A | 6/1973 | Pfiffner | |
| 4,769,685 A | 9/1988 | MacIver et al. | |
| 4,777,580 A * | 10/1988 | Bingham | 363/127 |
| 4,866,585 A * | 9/1989 | Das | 363/8 |
| 4,871,686 A | 10/1989 | Davies | |
| 4,875,151 A | 10/1989 | Ellsworth et al. | |
| 4,972,237 A | 11/1990 | Kawai | |
| 4,982,260 A | 1/1991 | Chang et al. | |
| 5,008,794 A | 4/1991 | Leman | |
| 5,072,268 A | 12/1991 | Rumennik et al. | |
| 5,164,891 A | 11/1992 | Keller | |
| 5,258,636 A | 11/1993 | Rumennik et al. | |
| 5,274,259 A | 12/1993 | Grabowski et al. | |
| 5,282,107 A * | 1/1994 | Balakrishnan | 361/18 |
| 5,285,367 A | 2/1994 | Keller | |
| 5,313,082 A | 5/1994 | Eklund | |
| 5,323,044 A | 6/1994 | Rumennik et al. | |
| 5,411,901 A | 5/1995 | Grabowski et al. | |
| 5,510,972 A * | 4/1996 | Wong | 363/127 |
| 5,612,567 A | 3/1997 | Baliga | |
| 5,850,337 A * | 12/1998 | Lee | 363/62 |
| 6,084,277 A | 7/2000 | Disney et al. | |
| 6,150,871 A | 11/2000 | Yee | |
| 6,157,049 A * | 12/2000 | Mitlehner et al. | 257/77 |
| 6,168,983 B1 | 1/2001 | Rumennik et al. | |

(Continued)

FOREIGN PATENT DOCUMENTS

| | | |
|---|---|---|
| CN | 101268605 | 9/2008 |
| EP | 0975024 | 1/2000 |
| JP | 2003142698 | 5/2003 |

OTHER PUBLICATIONS

Maleis: "Full-wave rectifier for CMOS IC chip". Reg. No. H64 May 6, 1986.

*Primary Examiner* — Adolf Berhane
*Assistant Examiner* — Fred E Finch, III
(74) *Attorney, Agent, or Firm* — The Law Offices of Bradley J. Bereznak

(57) ABSTRACT

An integrated circuit (IC) comprises a rectifier/regulator circuit coupled to receive an ac source voltage and output a regulated dc voltage. The rectifier/regulator circuit includes first and second switching elements that provide charging current when enabled. The first and second switching elements do not provide charging current when disabled. A sensor circuit is coupled to sense the regulated dc voltage and generate a feedback control signal coupled to the rectifier/regulator circuit that enables the first and second switching elements when the regulated dc voltage is above a target voltage, and disables the first and second switching elements when the regulated dc voltage is below the target voltage.

11 Claims, 3 Drawing Sheets

(56) References Cited

U.S. PATENT DOCUMENTS

| | | |
|---|---|---|
| 6,207,994 B1 | 3/2001 | Rumennik et al. |
| 6,252,288 B1 | 6/2001 | Chang |
| 6,366,485 B1 * | 4/2002 | Fujisawa ............ 363/127 |
| 6,424,007 B1 | 7/2002 | Disney |
| 6,445,600 B2 * | 9/2002 | Ben-Yaakov ............ 363/39 |
| 6,465,291 B1 | 10/2002 | Disney |
| 6,468,847 B1 | 10/2002 | Disney |
| 6,489,190 B2 | 12/2002 | Disney |
| 6,501,130 B2 | 12/2002 | Disney |
| 6,504,209 B2 | 1/2003 | Disney |
| 6,509,220 B2 | 1/2003 | Disney |
| 6,549,439 B1 * | 4/2003 | Yu ............ 363/127 |
| 6,552,597 B1 | 4/2003 | Disney et al. |
| 6,555,873 B2 | 4/2003 | Disney et al. |
| 6,555,883 B1 | 4/2003 | Disney et al. |
| 6,563,171 B2 | 5/2003 | Disney |
| 6,570,219 B1 | 5/2003 | Rumennik et al. |
| 6,573,558 B2 | 6/2003 | Disney |
| 6,577,512 B2 | 6/2003 | Tripathi et al. |
| 6,583,663 B1 | 6/2003 | Disney et al. |
| 6,633,065 B2 | 10/2003 | Rumennik et al. |
| 6,635,544 B2 | 10/2003 | Disney |
| 6,639,277 B2 | 10/2003 | Rumennik et al. |
| 6,661,276 B1 | 12/2003 | Chang |
| 6,667,213 B2 | 12/2003 | Disney |
| 6,680,646 B2 | 1/2004 | Disney |
| 6,683,344 B2 | 1/2004 | Tsukanov et al. |
| 6,724,041 B2 | 4/2004 | Rumennik et al. |
| 6,724,244 B2 | 4/2004 | Wu |
| 6,730,585 B2 | 5/2004 | Disney |
| 6,734,461 B1 | 5/2004 | Shiomi et al. |
| 6,734,714 B2 | 5/2004 | Disney |
| 6,750,105 B2 | 6/2004 | Disney et al. |
| 6,759,289 B2 | 7/2004 | Disney |
| 6,768,171 B2 | 7/2004 | Disney |
| 6,768,172 B2 | 7/2004 | Rumennik et al. |
| 6,777,749 B2 | 8/2004 | Rumennik et al. |
| 6,781,198 B2 | 8/2004 | Disney |
| 6,787,437 B2 | 9/2004 | Rumennik et al. |
| 6,787,847 B2 | 9/2004 | Disney et al. |
| 6,798,020 B2 | 9/2004 | Disney et al. |
| 6,800,903 B2 | 10/2004 | Rumennik et al. |
| 6,815,293 B2 | 11/2004 | Disney et al. |
| 6,818,490 B2 | 11/2004 | Disney |
| 6,825,536 B2 | 11/2004 | Disney |
| 6,828,631 B2 | 12/2004 | Rumennik et al. |
| 6,838,346 B2 | 1/2005 | Disney |
| 6,865,093 B2 | 3/2005 | Disney |
| 6,882,005 B2 | 4/2005 | Disney et al. |
| 6,933,769 B2 | 8/2005 | Koelling |
| 6,987,299 B2 | 1/2006 | Disney et al. |
| 7,092,268 B2 * | 8/2006 | George ............ 363/126 |
| 7,115,958 B2 | 10/2006 | Disney et al. |
| 7,135,748 B2 | 11/2006 | Balakrishnan |
| 7,193,402 B2 | 3/2007 | Lee et al. |
| 7,220,629 B2 | 5/2007 | Balakrishnan |
| 7,221,011 B2 | 5/2007 | Banerjee et al. |
| 7,233,191 B2 | 6/2007 | Wang et al. |
| 7,253,042 B2 | 8/2007 | Disney et al. |
| 7,253,059 B2 | 8/2007 | Balakrishnan |
| 7,295,451 B2 | 11/2007 | Charles |
| 7,301,389 B2 | 11/2007 | Coady |
| 7,335,944 B2 | 2/2008 | Banerjee |
| 7,348,830 B2 | 3/2008 | Debroux |
| 7,381,618 B2 | 6/2008 | Disney |
| 7,391,088 B2 | 6/2008 | Balakrishnan |
| 7,408,796 B2 * | 8/2008 | Soldano ............ 363/127 |
| 7,459,366 B2 | 12/2008 | Banerjee |
| 7,468,536 B2 | 12/2008 | Parthasarathy |
| 7,494,875 B2 | 2/2009 | Disney |
| 7,557,406 B2 | 7/2009 | Parthasarathy |
| 7,585,719 B2 | 9/2009 | Balakrishnan |
| 7,595,523 B2 | 9/2009 | Parthasarathy et al. |
| 7,616,050 B2 | 11/2009 | Eckstein |
| 7,741,788 B2 | 6/2010 | Ito et al. |
| 7,893,754 B1 | 2/2011 | Kung |
| 7,999,606 B2 | 8/2011 | Kung et al. |
| 8,125,265 B2 | 2/2012 | Kung et al. |
| 8,278,994 B2 | 10/2012 | Kung et al. |
| 8,300,440 B2 * | 10/2012 | Ho et al. ............ 363/84 |
| 8,373,356 B2 | 2/2013 | Shao et al. |
| 2001/0043480 A1 * | 11/2001 | Shona ............ 363/89 |
| 2002/0125541 A1 | 9/2002 | Korec et al. |
| 2004/0061454 A1 | 4/2004 | Prasad |
| 2004/0109335 A1 * | 6/2004 | Gan et al. ............ 363/127 |
| 2005/0167749 A1 | 8/2005 | Disney |
| 2005/0212583 A1 | 9/2005 | Pai |
| 2005/0230745 A1 | 10/2005 | Fatemizadeh et al. |
| 2005/0242411 A1 | 11/2005 | Tso |
| 2006/0028779 A1 | 2/2006 | Bax et al. |
| 2007/0146020 A1 | 6/2007 | Williams |
| 2007/0211504 A1 * | 9/2007 | Unkrich ............ 363/89 |
| 2008/0018261 A1 | 1/2008 | Kastner |
| 2008/0136350 A1 | 6/2008 | Tripathi et al. |
| 2008/0259653 A1 | 10/2008 | Baurle et al. |
| 2009/0016090 A1 * | 1/2009 | Knight ............ 363/127 |
| 2009/0040795 A1 | 2/2009 | Park et al. |
| 2009/0120200 A1 * | 5/2009 | Chakrabartty ............ 73/808 |
| 2009/0261790 A1 * | 10/2009 | Arduini ............ 323/266 |
| 2010/0109561 A1 | 5/2010 | Chen et al. |
| 2010/0194445 A1 | 8/2010 | Balakrishnan et al. |
| 2011/0149615 A1 | 6/2011 | Matthews |
| 2013/0020964 A1 | 1/2013 | Nuhfer et al. |

* cited by examiner

MONOLITHIC AC/DC CONVERTER FOR GENERATING DC SUPPLY VOLTAGE

TECHNICAL FIELD

The present disclosure generally relates to the field of integrated circuits, and more particularly to an integrated circuit for generating a regulated dc supply voltage from an ac line voltage.

BACKGROUND

An integrated circuit typically requires a regulated dc supply voltage for operation. This regulated dc supply voltage is typically derived from an ac line voltage via external circuit components arranged to implement a discrete rectifier. Existing rectifier circuits such as half-bridge or full-bridge rectifier circuits are usually implemented with discrete diodes. A separate stage of regulation circuitry typically includes discrete components, such as a capacitor, to provide regulation to the dc voltage received from the rectifier. The use of discrete components increase material costs and require additional space on a printed circuit board (PCB) to provide the regulated dc supply voltage for an integrated circuit.

BRIEF DESCRIPTION OF THE DRAWINGS

The present invention is illustrated by way of example, and not limitation, in the figures of the accompanying drawings, wherein.

DESCRIPTION OF EXAMPLE EMBODIMENTS

In the following description specific details are set forth, such as material types, voltages, component values, configurations, etc., in order to provide a thorough understanding of the present invention. However, persons having ordinary skill in the relevant arts will appreciate that these specific details may not be needed to practice the embodiments described.

It should be understood that the elements in the figures are representational, and are not drawn to scale in the interest of clarity. It is also appreciated that although an IC utilizing N-channel field-effect transistor devices is disclosed, P-channel transistors may also be utilized in alternative embodiments. In still other embodiments, some or all of the metal-oxide-semiconductor field-effect transistor (MOSFET) devices show by way of example may be replaced with bipolar junction transistors (BJTs), insulated gate field effect transistor (IGFETs), or other device structures that provide an active switching function. Furthermore, those with skill in the art with integrated circuits and power converter devices will understand that transistor devices such as those shown by way of example in the figures may be integrated with other transistor device structures, or otherwise fabricated or configured in a manner such that different devices share common connections and semiconductor regions (e.g., N-well, substrate, etc.).

In the context of the present application, when a transistor is in an "off state" or "off" the transistor is unable to conduct current. Conversely, when a transistor is in an "on state" or "on" the transistor is able to conduct current. In one embodiment, a high-voltage transistor comprises an N-channel metal-oxide-semiconductor field-effect transistor (MOSFET) with the high-voltage being supported between the first terminal, a source, and the second terminal, a drain.

For purposes of this disclosure, "ground" or "ground potential" refers to a reference voltage or potential against which all other voltages or potentials of a circuit or IC are defined or measured.

Figure 1:
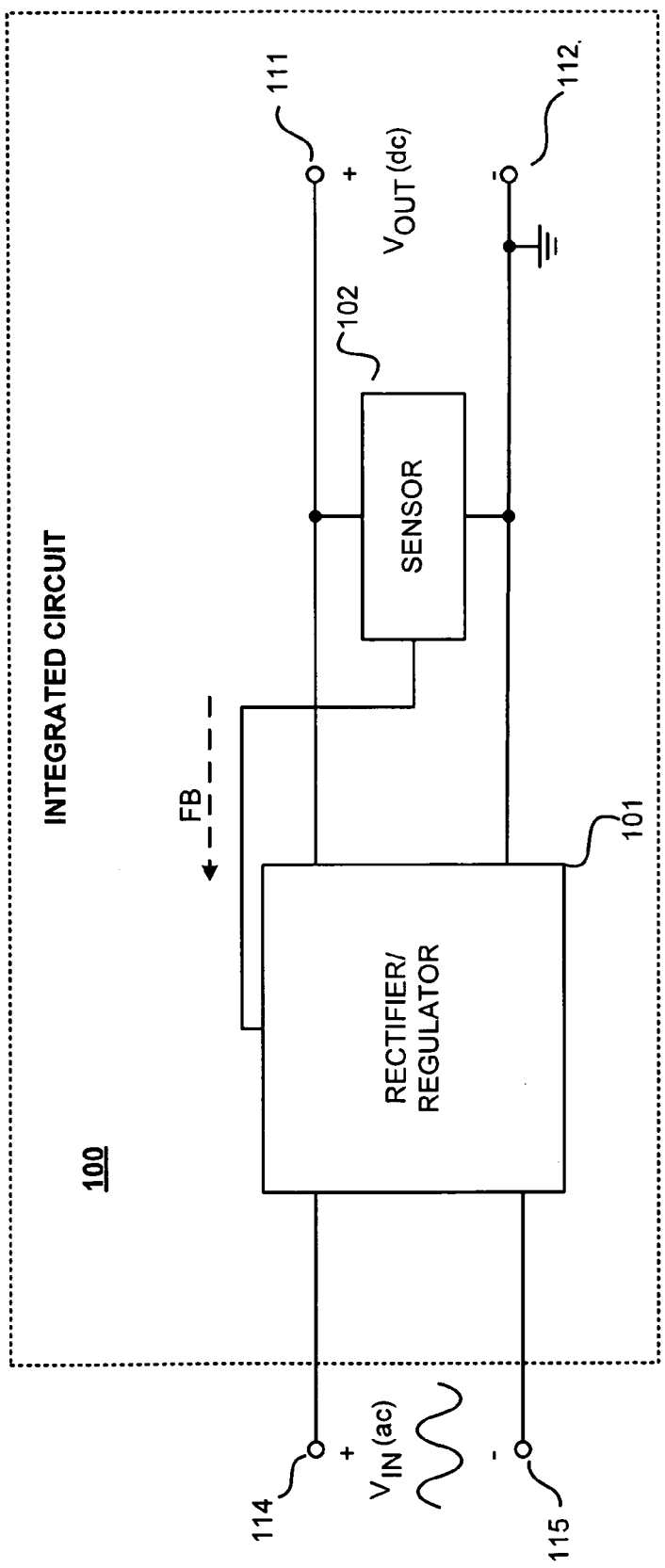
FIG. 1 illustrates an example block diagram of a monolithic ac/dc power converter for generating a dc power supply voltage on an integrated circuit (IC).

FIG. 1 illustrates an example block diagram of an ac/dc power converter for generating a dc power supply voltage on an integrated circuit (IC) 100. As shown, IC 100 includes a rectifier/regulator circuit 101 coupled to receive an externally-generated ac input voltage, $V_{IN}$, applied across input terminals or pins 114 & 115. In one example, input voltage, $V_{IN}$, may be an ordinary ac line voltage (e.g., 85 V ac-265 V ac; 50-60 Hz). In another example, IC 100 may be implemented in a three phase system. In another example, IC 100 may be a monolithic IC. As shown, rectifier/regulator 101 functions to provide rectification to the ac input voltage $V_{IN}$ and regulate an output voltage $V_{OUT}$ across terminals 111 and 112. Stated differently, the ac input voltage $V_{IN}$ is converted to a dc output voltage $V_{OUT}$, such that the polarity of the output signal remains unchanged (positive).

As shown, sensor circuit 102 is coupled between terminals 111 and 112 to receive the dc voltage output from rectifier/regulator circuit 101 and to output a feedback signal FB in response to dc output voltage $V_{OUT}$, provided across output terminals 111 and 112. By way of example, regulated dc voltage $V_{OUT}$ may be configured as a supply voltage of a low voltage (e.g., 5 V) at terminal 111 with respect to terminal 112 at ground (0 V). It is appreciated that the output voltage $V_{OUT}$, produced across output nodes 111 and 112, may be used as a supply voltage for operation of circuitry internal to IC 100. In another example, output voltage $V_{OUT}$ may be used for operation of circuitry external to IC 100.

Figure 2:
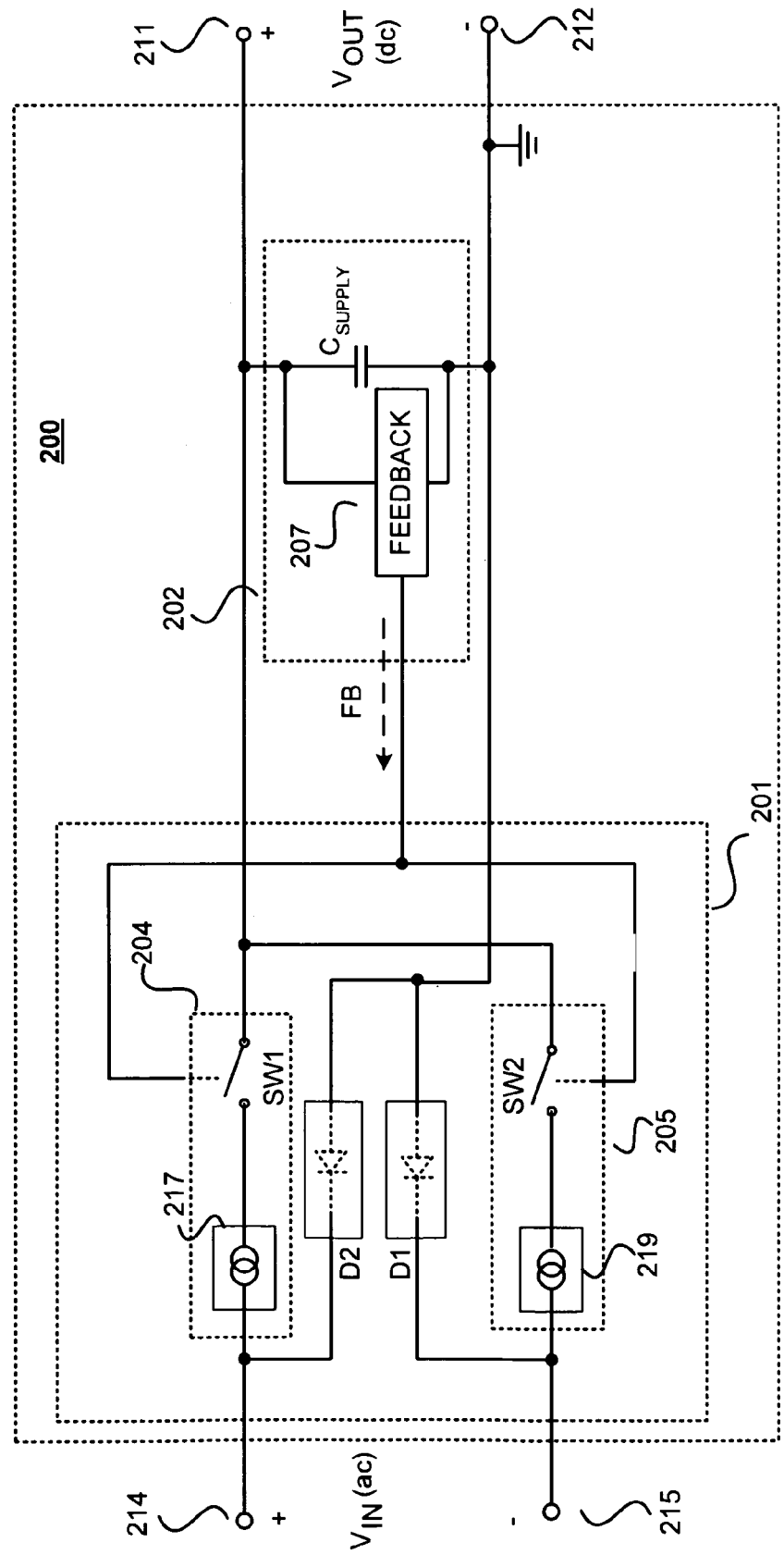
FIG. 2 illustrates an example conceptual circuit schematic diagram of the monolithic ac/dc power converter circuit shown in FIG. 1.

FIG. 2 illustrates an example conceptual circuit schematic diagram of an ac/dc power converter for generating a regulated dc output voltage $V_{OUT}$ in an integrated circuit 200. As shown, integrated circuit 200 includes rectifier/regulator 201 and sensor 202 which are possible implementations of rectifier/regulator 101 and sensor 102 respectively, of power converter 100 of FIG. 1. In this example, rectifier/regulator 201 is shown comprising switching elements 204 and 205, each having one connection end or side respectively connected to terminals 214 and 215. As shown, switching elements 204 and 205 comprise first and second current sources 217 and 219 are coupled to receive input voltage $V_{IN}$ from input terminals 214 and 215, respectively. As further shown, switching elements 204 and 205 further include switches SW1 and SW2 that are coupled to current sources 217 and 219, respectively.

In one embodiment, current sources 217 and 219 are constant current sources that selectively provide a constant charge current in response to the polarity of the input voltage $V_{IN}$. For example, current source 217 may provide a constant charge current when the input voltage $V_{IN}$ is at a higher potential at terminal 214 with respect to terminal 215. Similarly, current source 219 may provide a constant charge current when input voltage $V_{IN}$ is at a higher potential at terminal 215 with respect to terminal 214. In another embodiment, the magnitude of charge current generated by current sources 217 and 219 may be dependent on input voltage $V_{IN}$.

Switches SW1 and SW2 are controlled by feedback signal FB. In operation, switching element 204 provides a constant charge current to capacitor $C_{SUPPLY}$ when SW1 is on and current source 217 is providing charge current. Switch SW1 restricts the flow of charge current from current source 217 in response to feedback signal FB. Similarly, switching element 205 provides a constant charge current to capacitor $C_{SUPPLY}$ when SW2 is on and current source 219 is providing charge. Switch SW2 restricts the flow of charge current from current source 219 in response to feedback signal FB. In one embodiment, based on the polarity of the input voltage $V_{IN}$, feedback signal FB may be split into two independent signals independently controlling switches 204 and 205.

Rectifier/regulator circuit 201 also includes diode elements D1 and D2 which have their cathodes respectively connected to input terminals 215 and 214. The anodes of diodes D1 & D2 are commonly connected to ground at node 212. In one example, diode elements D1 and D2 are body diodes of the substrate material of integrated circuit 200. In operation, diode elements D1 and D2 are coupled to provide a complete return path for charge current flowing through supply capacitor $C_{SUPPLY}$. Supply capacitor $C_{SUPPLY}$ is shown coupled between output nodes or terminals 211 and 212 to provide a regulated output voltage $V_{OUT}$ (dc).

Persons of ordinary skill in the art will understand that when either diode elements D1 or D2 is conducting, the current flowing through D1 or D2 is a substrate current consisting of minority carriers. To prevent this substrate current from adversely affecting other circuits on IC 100, ordinary double guard rails may be utilized in the layout of IC 100 to confine or attenuate the substrate current. For example, in one embodiment where IC 100 is fabricated with a P-type substrate, N+/N-well and P+ double guard rails may be formed around the diode elements D1 and D2. The double guard rails may be of a type ordinarily used in electrostatic discharge (ESD) protection circuitry. It is appreciated that the size or area used to implement the double guard rails may vary in different embodiments, depending on the level of confinement or attenuation required. In general, a larger double guard rail area provides a higher level of confinement/attenuation.

Continuing with the example of FIG. 2, a feedback circuit 207 is shown coupled across supply capacitor $C_{SUPPLY}$. In operation, feedback circuit 207 outputs a feedback signal FB in response to sensing the output voltage $V_{OUT}$. Feedback signal FB is coupled to either open or close switches SW1 and SW2. For example, during the first phase of input voltage $V_{IN}$, when switches SW1 and SW2 are closed and the voltage at input terminal 214 is high with respect to the voltage at terminal 215, current source 217 is on and a charging current is output to supply capacitor $C_{SUPPLY}$. In this case, the charging current flows in a path through supply capacitor $C_{SUPPLY}$ and back to terminal 215 through diode element D1, thereby charging supply capacitor $C_{SUPPLY}$.

Similarly, during the second phase of the input voltage $V_{IN}$, when switches SW1 and SW2 are closed and the voltage at input terminal 215 is high with respect to the voltage at terminal 214, current source 219 is on and a charging current is again output to supply capacitor $C_{SUPPLY}$. In this case, the charging current flows in a path through supply capacitor $C_{SUPPLY}$ and back to terminal 214 through diode element D2, thereby charging supply capacitor $C_{SUPPLY}$.

When the output voltage $V_{OUT}$ is at or above the target, regulated value (e.g., 5 V), feedback element 207 outputs a feedback signal FB to turn off (open) switches SW1 and SW2, which prevents further charging of supply capacitor $C_{SUPPLY}$ from occurring. When the voltage potential at node 211 drops below the target, regulated value, feedback element 207 outputs a feedback signal FB to turn on (close) switches SW1 and SW2, thus resuming the charging of supply capacitor $C_{SUPPLY}$. Operation of the circuitry shown in the example of FIG. 2 may continue in this manner as long as IC 200 remains powered on.

Figure 3:
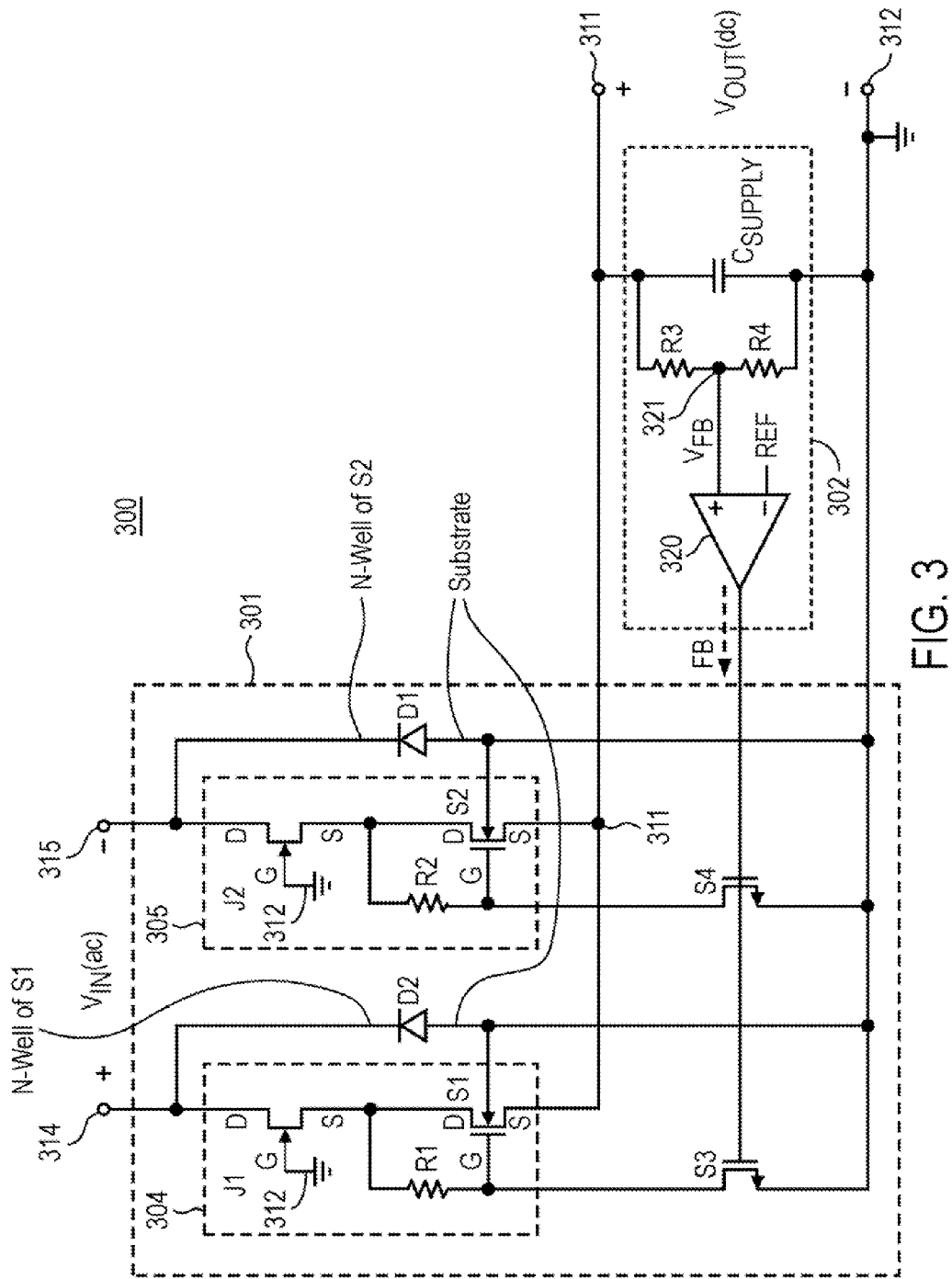
FIG. 3 illustrates an example detailed circuit schematic diagram of the monolithic ac/dc power converter circuit shown in FIGS. 1 & 2.

FIG. 3 illustrates an example detailed circuit schematic diagram of an integrated ac/dc power converter circuit 300. Integrated circuit 300 is one possible implementation of IC 100 of FIG. 1 and IC 200 of FIG. 2. As shown, IC 300 includes a rectifier/regulator circuit 301 and sensor circuit 302. In the embodiment of FIG. 3 switching elements 304 and 305 of rectifier/regulator 301 are each shown being implemented by a junction field effect transistor (JFET) connected to a resistor and an n-channel metal oxide semiconductor field effect transistor (MOSFET). For example, switching element 304 may comprise an N-JFET J1 having a first terminal D (drain) coupled to input terminal 314, a second terminal G (gate) coupled to ground node 312, and a third terminal S (source) coupled to a first end of resistor R1 and the drain of MOSFET S1. A second end of resistor R1 is coupled to the gate G of MOSFET S1. The source S of MOSFET S1 is coupled to node 311. Likewise, switching element 305 comprises an N-JFET J2 having a first terminal D (drain) coupled to input terminal 115, a second terminal G (gate) grounded, and a third terminal S (source) coupled to the drain of MOSFET S2. Resistor R2 is shown coupled between the gate and drain of MOSFET S2. The source of MOSFET S2 is coupled to node 311.

Diode elements D1 and D2 are shown having both their anodes connected to ground node 312 and their cathodes respectively connected to input terminals 315 and 314. In one embodiment, diode elements D1 and D2 are implemented as parasitic substrate diodes; that is, a P-type substrate of IC 300 is the anode of both D1 and D2, with the cathode of each diode element D1 and 02 comprising the N-type drain region of the associated JFET, J2 and J1, respectively. In other words; diode element D1 is a pn junction comprising a P-type substrate of IC 300 and an N-type drain region of JFET J2. Likewise, diode element D2 is a pn junction comprising a P-type substrate of IC 300 and an N-type drain region of JFET J1. As described above in connection with the example of FIG. 2, double guard rails comprising N+/N-well and P+ regions may be formed around each of JFETs J1 and J2 in the layout of IC 300 to confine or attenuate the substrate current that flows through diode elements D1 and D2.

In the example of FIG. 3, each of the JFETs J1 and J2 may be integrated with its associated MOSFET. In other words, switching elements 304 and 305 may be implemented by a single integrated device structure which comprises two elements that share a common N-type well region. In one embodiment, switching element 304 may be able to withstand greater than 1000 V across the drain D of J1 and the source S of S1. Similarly, switching element 305 may be able to withstand greater than 1000 V across the drain D of J2 and the source S of S2. In another example, JFETs J1 and J2 may be part of a separate high voltage circuit and/or device that performs a different function on IC 300.

In the embodiment of FIG. 3, voltage sensor circuit 302 comprises a supply capacitor $C_{SUPPLY}$ connected across output terminals 311 and 312. Voltage sensor circuit 302 further comprises a comparator 320 configured with the negative input coupled to a voltage reference, $V_{REF}$, and the positive input connected to a node 321. Node 321 provides a feedback voltage $V_{FB}$ with respect to ground terminal 312. In the example shown, feedback voltage $V_{FB}$ is representative of regulated output voltage $V_{OUT}$ and is generated from a resistor divider network comprising resistors R3 and R4 coupled in series across output terminals 311 and 312. In operation, the output signal, FB, generated by comparator 320 drives the gates of n-channel MOSFETs S3 & S4. The sources of MOSFETs S3 & S4 are coupled to ground terminal 312. The drains of MOSFETs S3 & S4 are respectively connected to the gates of MOSFETs S1 & S2. In one embodiment, MOSFETs S3 and S4 are level shifters that control the voltage at the gates of MOSFETs S1 & S2, thereby allowing switches S1 and S2 to turn on and off.

In operation, voltage sensor 302 operates by comparing the voltage $V_{FB}$ appearing at node 321 against reference voltage $V_{REF}$. In one embodiment, the value of resistors R3 and R4 are selected in order to regulate output voltage $V_{OUT}$ at a desired target value. When the voltage at node 321 exceeds the voltage reference $V_{REF}$, thus indicating that output voltage $V_{OUT}$ has exceeded its target, regulated value, comparator 320 switches MOSFETs S3 and S4 on, which turn MOSFETs S1 and S2 off, thereby disabling switching elements 304 and 305. Conversely, when the voltage $V_{FB}$ at node 321 drops below $V_{REF}$, due to output voltage $V_{OUT}$ dropping below its target, regulated value, the output of comparator 320 drops low, causing MOSFETs S3 & S4 to turn off. When both MOSFETs S3 & S4 are in an off state, switching element 304 or switching element 305 conducts charge current, depending on the polarity of the input ac voltage $V_{IN}$.

When the voltage potential at terminal 314 is high with respect to terminal 315, switch 304 is conducting and switch 305 is not conducting, and supply capacitor $C_{SUPPLY}$ is charged by the current flowing from terminal 314 through JFET J1, MOSFET S1, and supply capacitor $C_{SUPPLY}$, and back through diode D1 to terminal 315. On the other hand, when the voltage potential at node 315 is high with respect to node 314, switch 304 is not conducting, switch 305 is conducting, and supply capacitor $C_{SUPPLY}$ is charged by the current flowing from terminal 315 through JFET J2, MOSFET S2, and supply capacitor $C_{SUPPLY}$, and back through diode D2 to terminal 314.

Although the present invention has been described in conjunction with specific embodiments, those of ordinary skill in the arts will appreciate that numerous modifications and alterations are well within the scope of the present invention. Accordingly, the specification and drawings are to be regarded in an illustrative rather than a restrictive sense.

I claim:

1. A monolithic integrated circuit (IC) fabricated on a substrate material, the monolithic IC for generating, from an ac input voltage, a regulated dc voltage between a first output node and a second output node, the monolithic IC comprising:
    a rectifier/regulator circuit coupled to receive the ac input voltage across first and second input terminals, the rectifier/regulator circuit including
        a first switching element that includes
            a first MOSFET and
            a first junction field-effect transistor (JFET) coupled in series between the first input terminal and the first output node,
        a second switching element that includes
            a second MOSFET and
            a second junction field-effect transistor (JFET) coupled in series between the second input terminal and the first output node, and
        first and second, body diodes each having an anode coupled to the second output node, a cathode of the first body diode being coupled to the first input terminal and a cathode of the second body diode being coupled to the second input terminal, a charging current alternately flowing through the first body diode when the second switching element is turned on and through the second body diode when the first switching element is turned on; and
    a sensor circuit coupled between the first output node and the second output node, the sensor circuit being operable to sense the regulated dc voltage and generate a feedback signal therefrom, the feedback signal being coupled to control the first and second switching elements,
    wherein the feedback signal turns off the first and second switching elements, thereby preventing the charging current from being provided to the first output node when the regulated dc voltage is above a target voltage, the feedback signal turning on the first and second switching elements, thereby providing the charging current to the first output node when the regulated dc voltage is below the target voltage.

2. The monolithic IC of claim 1 wherein the sensor circuit further includes a supply capacitor coupled between the first output node and the second output node.

3. The monolithic IC of claim 1 wherein the sensor circuit further includes:
    a voltage divider coupled between the first output node and the second output node, the voltage divider generating a feedback input voltage from the regulated dc voltage; and
    a comparator that generates the feedback signal by comparing the feedback input voltage to a reference voltage.

4. The monolithic IC of claim 1 wherein the cathode of the first body diode comprises an N-type well region of the second JFET and the cathode of the second body diode comprises an N-type well region of the first JFET.

5. A monolithic integrated circuit (IC) fabricated on a substrate material, the monolithic IC for generating, from an ac input voltage, a regulated dc voltage between a first output node and a second output node, the monolithic IC comprising:
    a rectifier/regulator circuit coupled to receive the ac input voltage across first and second input terminals, the rectifier/regulator circuit including
        a first switching element that includes
            a first MOSFET coupled between the first input terminal and the first output node and
            a first junction field-effect transistor (JFET) coupled between the first input terminal and a drain of the first MOSFET
        a second switching element that includes
            a second MOSFET coupled between the second input terminal and the first output node and
            a second JFET coupled between the second input terminal and a drain of the second MOSFET and
        first and second body diodes each having an anode coupled to the second output node, a cathode of the first body diode being coupled to the second input terminal and the cathode of the second body diode being coupled to the first input terminal, the cathode of the first body diode comprising a common well region shared by the second MOSFET and second JFET, the cathode of the second body diode comprising a common well region shared by the first MOSFET and first JFET, a charging current alternately flowing through the first body diode when the first switching element is turned on and through the second body diode when the second switching element is turned on; and
    a sensor circuit coupled between the first output node and a second output node, the sensor circuit being operable to sense the regulated dc voltage at the first output node and generate a feedback signal therefrom, the feedback signal being coupled to control the first and second switching elements, the sensor circuit including a capacitor coupled between the first output node and the second output node, a voltage divider coupled between the first output node and the second output node, the voltage divider generating a feedback input voltage from the regulated dc voltage, a comparator that generates the feedback signal by comparing the feedback input voltage to a reference voltage, and wherein the feedback signal turns off the first and second switching elements, thereby preventing the charging current from being provided to the first output node when the regulated dc voltage is above a target voltage, the feedback signal turning on the first and second switching elements, thereby providing the charging current to the first output node when the regulated dc voltage is below the target voltage.

6. An integrated circuit (IC) comprising:

a rectifier/regulator circuit coupled to receive an ac source line voltage of between 85 to 265 V AC and output a regulated dc supply voltage suitable for supplying integrated circuitry, the rectifier/regulator circuit including first and second high-voltage switching elements that selectively provide charging current when enabled, the first and second high-voltage switching elements capable of supporting a voltage difference between the ac line voltage and the regulated dc supply voltage between a first main terminal and a second main terminal; and a sensor circuit coupled to sense the regulated dc supply voltage and generate a feedback signal the rectifier/regulator circuit that turns on the first and second switching elements to conduct current when the regulated dc supply voltage is below a target voltage and turns off the first and second switching elements when the regulated dc supply voltage is above the target voltage.

7. The IC of claim 6 wherein the first and second switching elements are respectively coupled to first and second input terminals, the first and second input terminals being coupled to receive the ac source line voltage.

8. The IC of claim 6 wherein the sensor circuit includes a supply capacitor coupled between a first output node and a second output node across which the regulated dc supply voltage is output.

9. The IC of claim 8 wherein the sensor circuit further includes a feedback circuit that regulates charging of the supply capacitor to maintain the regulated dc supply voltage.

10. The IC of claim 8 further comprising first and second body diodes each coupled to provide a return path for load current and charge current flowing through the supply capacitor.

11. The IC of claim 6 wherein the regulated dc supply voltage is a 5V dc supply voltage.

* * * * *